(12) United States Patent
Pattabiraman et al.

(10) Patent No.: US 9,900,443 B2
(45) Date of Patent: Feb. 20, 2018

(54) MANAGING CHARGING SYSTEM TRAFFIC

(71) Applicant: VERIZON PATENT AND LICENSING INC., Arlington, VA (US)

(72) Inventors: Ravikumar Pattabiraman, Hillsborough, NJ (US); Lixia Yan, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 489 days.

(21) Appl. No.: 14/495,567

(22) Filed: Sep. 24, 2014

(65) Prior Publication Data

US 2016/0088163 A1    Mar. 24, 2016

(51) Int. Cl.
*H04M 11/00*    (2006.01)
*H04M 15/00*    (2006.01)
*H04W 4/24*     (2018.01)
*H04M 17/02*    (2006.01)

(52) U.S. Cl.
CPC ........... *H04M 15/64* (2013.01); *H04M 15/84* (2013.01); *H04M 15/85* (2013.01); *H04M 15/854* (2013.01); *H04M 15/855* (2013.01); *H04M 17/02* (2013.01); *H04W 4/24* (2013.01)

(58) Field of Classification Search
None
See application file for complete search history.

(56) References Cited

U.S. PATENT DOCUMENTS

| 2011/0170455 A1* | 7/2011 | Cai ...................... H04L 12/1403 370/259 |
| 2012/0131207 A1* | 5/2012 | Xu ......................... H04M 15/20 709/227 |
| 2012/0276867 A1* | 11/2012 | McNamee .......... H04L 12/1407 455/406 |

* cited by examiner

Primary Examiner — Charles Appiah
Assistant Examiner — Alexander Yi (57) ABSTRACT

Systems and methods for an enhanced online charging system service are described. A first signaling message is received from an originating mobile station for transmission over a network to a destination mobile station, wherein the first signaling message includes a voice message or a data message. A request from a mobile switching center (MSC), Short Message Service Center (SMSC) or Telephony Application Server (TAS) is provided to an online charging system (OCS) to determine an account usage balance associated with the mobile station. When the OCS determines the account is associated with valid monthly prepaid wireless subscription plan, a first response message is received at the MSC, SMC or TAS. The first response message indicates to the MSC, SMC or TAS to not send, for a predetermined time period, further requests to the OCS to determine an account usage balance associated with the mobile station.

22 Claims, 8 Drawing Sheets

| <CCR> ::= < Diameter Header: 272, REQ, PXY > AVP | AVP Code | XML element |
|---|---|---|
| <Session-Id> | 263 | Request TID |
| {Origin-Host} | 264 | |
| {Origin-Realm} | 296 | |
| {Destination-Realm} | 283 | |
| {Auth-Application-Id} | 258 | |
| {CC-Request-Type} | 416 | |
| {CC-Request-Number} | 415 | |
| [Service-Context-Id] | 461 | |
| [Service-Specific-Info] | 1249 | |
| [Event-Timestamp] | 55 | response_timestamp |
| [Requested-Action] | 436 | |
| *[Subscription-Id] | 443 | SubscriberID |
| [Subscription-Id-Type] | 450 | Set to END_USER_E164 |
| [Subscription-Id-Data] | 444 | MDN |
| [Multiple-Services-Indicator] | 455 | |
| *[Multiple-Services-Credit-Control] | 456 | |
| [Service-Specific-Info] | 1249 | ServiceType: MO or MT or <billingID from MSC Database>MO or <billingID from MSC Database>MT |
| [Service-Specific-Info] | 1249 | International Indicator |
| [Service-Specific-Info] | 1249 | MerchantID |
| [Rating-Group] | 432 | ContentType: This AVP will include subscriber's billing id |
| [Recipient-Address] | 1201 | AddressList: This AVP will contain MT MDN for MO SMS |
| [Originator-Address] | 888 | AddressList: This AVP will contain MO address for MT SMS |
| [Requested-Service-Unit] | 437 | Units |
| [CC-Service-Specific-Units] | 417 | |

*FIG. 2*

Service-Specific-Info ::=< AVP Header: 1249 >
 [ Service-Specific-Data ]
 [ Service-Specific-Type ]

| Service-Specific-Type | Service-Specific-Data<br>Sent by OCS | Service-Specific-Type<br>Description |
|---|---|---|
| 2100 | Timestamp; | Expiration timestamp of the result-code |
| 2110 | Timezone; coded as specified in 3GPP TS 29.274 in UE-Time Zone IE is used to indicate the offset between universal time and local time in steps of 15 minutes of where the UE currently resides | Subscriber Timezone |

*FIG. 3*

| <CCA> ::= < Diameter Header: 272, PXY > AVP | AVP Code | XML element |
|---|---|---|
| <Session-Id> | 263 | |
| {Origin-Host} | 264 | |
| {Origin-Realm} | 296 | |
| {Auth-Application-Id} | 258 | |
| {CC-Request-Type} | 416 | |
| {CC-Request-Number} | 415 | |
| [Result-Code] | 268 | Result-code |
| *[Multiple-Services-Credit-Control] | 456 | |
| [Service-Specific-Info] | 1040 | Merchant ID |
| [Service-Specific-Info] | 1040 | Biling ID |
| [Service-Specific-Info] | 1040 | information provider |
| [Service-Specific-Info] | 1040 | Timezone of transaction time |
| [Range-Group] | 422 | |
| [Recipient-Address] | 1201 | |
| [Originator-Address] | 886 | |
| [Result-Code] | 268 | 1. 4011_DIAMETER_CREDIT_CONTROL_N OT_APPLICABLE = Sunpply error INOverride<br>2. 4010_DIAMETER_END_USER_SERVICE_DENIED = UC error code 5 Subscriber Activity Barred<br>3. 4012_DIAMETER_CREDIT_LIMIT_REAC HED = UC error code 55 Balance Too Low<br>4. 5003_DIAMETER_AUTHORIZATION_REJ ECTED = UC error code 57 Usage Limit reached |
| [Direct-Debiting-Failure-Handling] | 428 | |
| [Remaining-Balance] | 2021 | Balance |
| {Unit-Value} | 445 | |
| {Currency-Code} | 425 | |
| [Cost-Information] | 423 | DebitAmount |
| {Unit-Value} | 445 | |
| {Currency-Code} | 425 | |
| *[Failed-AVP] | 279 | |

*FIG. 4*

OCS 44 may send following AVP to MSC 42 when a user has purchased monthly plan on 04/19/2014 that is to expire by 05/19/2014

MSCC
    result-code= 4011
    Service-Specific-Info    ::=< AVP Header: 1249>
        [ Service-Specific-Data ] = 1400558399    (05/19/2014)
        [ Service-Specific-Type ] = 0xAB000834

Service-Specific-Info    ::=< AVP Header: 1249>
        [ Service-Specific-Data ] = -5:00  Daylight Saving Time: +1 hour (EST)
        [ Service-Specific-Type ]= 0xAB000835

MANAGING CHARGING SYSTEM TRAFFIC

BACKGROUND

In recent years, mobile station (e.g., smartphone) usage has significantly increased. Mobile station users often purchase voice and data plans that allow the users to prepay for voice and data services provided by a wireless network provider. Prepaid price plans have evolved to offer unlimited voice and messaging as well as diverse capped data plans.

Presently, for every voice and message communication originating from (or terminated at) a mobile station, a voice and message network element of the wireless network provider validates with a charging system if there is sufficient account balance for the voice and message communication. Such validation can occur even when the user has purchased an unlimited data and voice plan or a capped data plan that has not yet expired. Thus, for each call or data request, there can be an interaction between the voice and messaging network element and the charging system. As a result, mobile stations subscribed to such plans can contribute to wastage of network resources.

As the foregoing illustrates, a new approach for managing charging system traffic with consideration to such concerns may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to an enhanced OCS service. As shall be described further below, the disclosed implementations avoid recurring validations from a voice and message network element of a wireless network with an OCS service when a mobile station is associated with a prepaid data plan that may be valid or unexpired.

Reference now is made in detail to the examples illustrated in the accompanying drawings and discussed below.

Figure 1A:
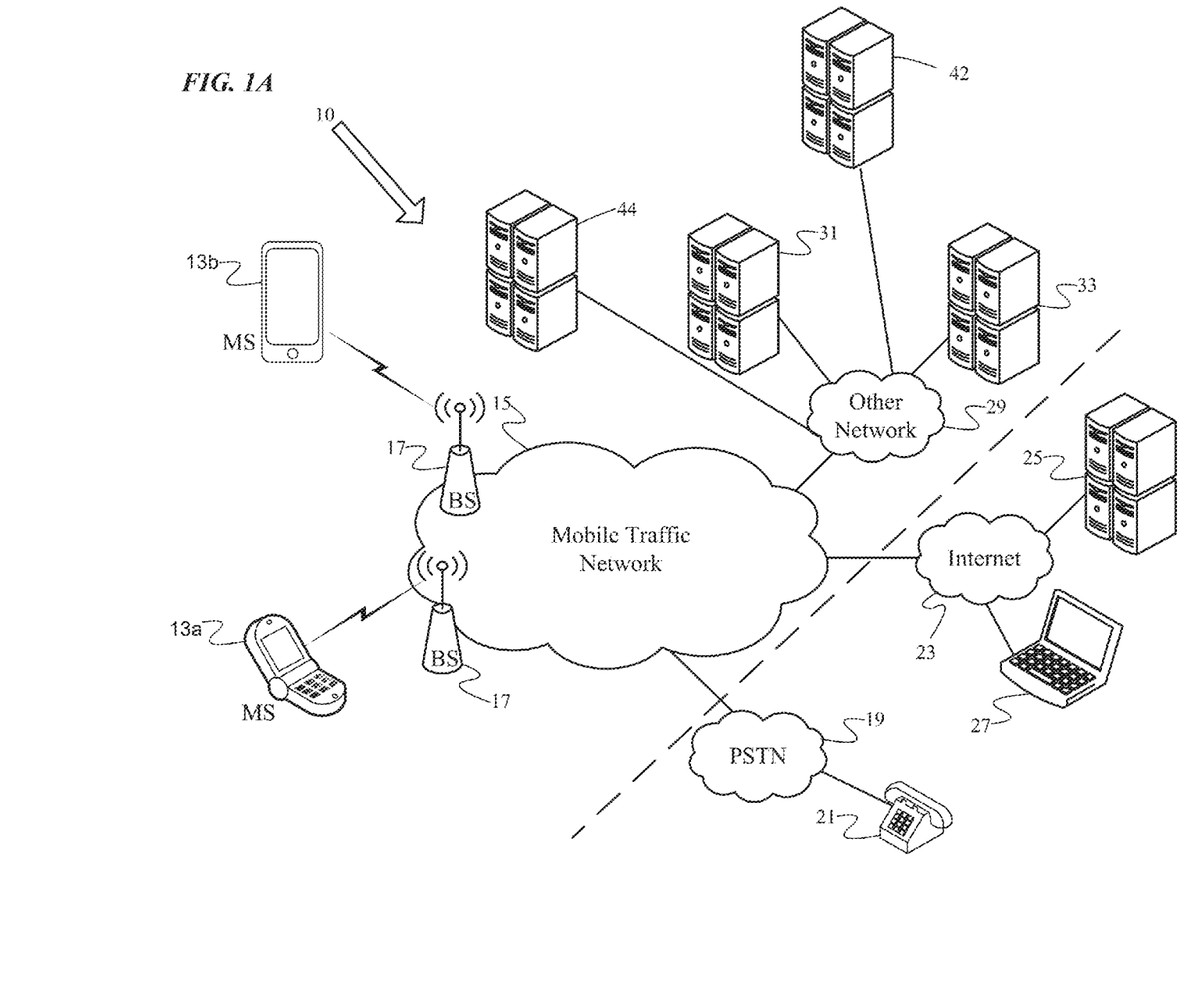
FIG. 1A illustrates a high-level functional block diagram of an exemplary system of networks/devices that provide various communications for mobile stations and support an example of the enhanced online charging system (OCS) service.

FIG. 1 illustrates an exemplary system 10 offering a variety of mobile communication services, including communications related to the enhanced OCS service by mobile station users. The example shows simply two mobile stations (MSs) 13a and 13b as well as a mobile communication network 15. The stations 13a and 13b are examples of mobile stations that may communicate with the enhanced OCS service. However, the network will provide similar communications for many other similar users as well as for mobile devices/users that do not participate in communication with the enhanced OCS service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Long Term Evolution (LTE) standard, the Global System for Mobile (GSM) communication standard, a time division multiple access (TDMA) standard or other standards used for public mobile wireless communications. The mobile stations 13a and 13b may are capable of voice telephone communications through the network 15, and for communication related to the enhanced OCS service the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with devices like those shown at 25 and 27 as well as with a variety of other types of devices or systems capable of data communications through various interconnected networks. The mobile stations 13a and 13b can also can receive and execute applications written in various programming languages, as discussed more later.

Mobile stations 13a and 13b can take the form of portable handsets, smart-phones or personal digital assistants, although they may be implemented in other form factors. Program applications, including an application to assist in the enhanced OCS service and/or an application associated with the enhanced OCS service can be configured to execute on many different types of mobile stations 13a and 13b. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as those serving mobile stations 13a and 13b, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13a and 13b, when the mobile stations 13a and 13b are within range. Each base station can include a BTS coupled to several antennae mounted on a radio tower within a coverage area often referred to as a "cell." The BTS is the part of the radio network that sends and receives RF signals to/from the mobile stations 13a and 13b that are served by the base station 17.

The radio access networks can also include a traffic network represented generally by the cloud at 15, which carries the user communications and data for the mobile stations 13a and 13b between the base stations 17 and other elements with or through which the mobile stations 13a and 13b communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier can also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13a or 13b communicates over the air with a base station 17 and through the traffic network 15 for various voice and data communications, e.g. through the Internet 23 with a server 25 and/or with application servers 31. If the mobile service carrier offers an enhanced OCS service, the service may be hosted on a carrier operated application server 31, for communication via the networks 15 and 29. Alternatively, the enhanced OCS service may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13. However, for purposes of further discussion, we will focus on functions thereof in support of the enhanced OCS service. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10. A similar authentication function may be provided for enhanced OCS service(s) offered via the server 25, either by the server 33 if there is an appropriate arrangement between the carrier and the operator of server 24, by a program on the server 25 or via a separate authentication server (not shown) connected to the Internet 23.

Figure 1B:
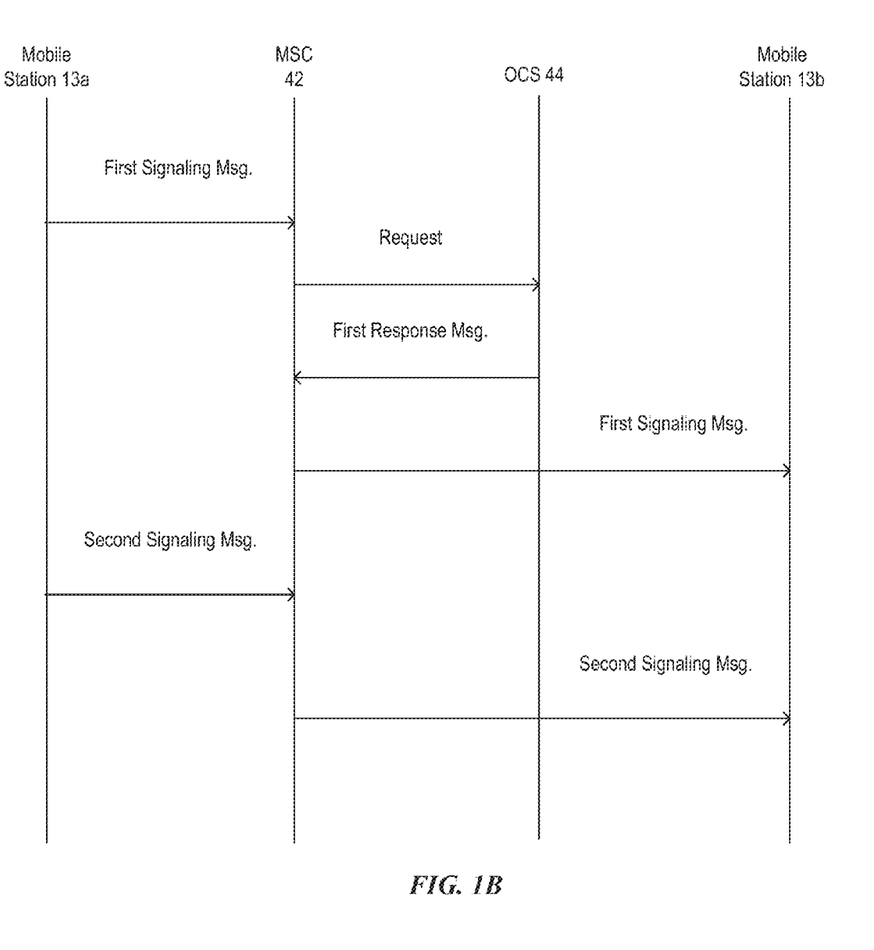
FIG. 1B illustrates an exemplary timing diagram for the enhanced online charging OCS service.

In some implementations, and with reference to FIG. 1B, a first signaling message from an originating mobile station 13a for transmission over a network to a destination mobile station is received at a mobile switching center (MSC) 42. It is to be appreciated that the first signaling message need not be the very first message received at the mobile station 13a. Rather the terms first, second etc. as used herein with respect to messages are used to clarify their relative timing with respect to each other. For example, the first signaling message arrives before a second signaling message. The first signaling message received at the originating mobile station 13a can request a voice message or a data message. For example, a user at the mobile station 13a can initiate a text message that is to be delivered to mobile station 13b. The first signaling message or second signaling message can be generated by mobile station 13*a* to request voice or message or data service.

Upon receiving the message from the originating mobile station 13*a*, and as shown in FIG. 1B, a request can be provided from the MSC 42 to an OCS 44 to determine an account usage balance associated with the originating mobile station 13*a*. When it is determined at the OCS 44 that that the account is associated with valid monthly prepaid wireless subscription plan, a first response message is received at the MSC 42, where the first response message indicates to the MSC 42 to not send, for a predetermined time such as the end of the month for the plan subscribed to by the originating mobile station 13*a*, further requests to the OCS 44 to determine an account usage balance associated with the mobile station. In some implementations, this operation to not send further requests to the OCS 44 to determine an account usage balance associated with the mobile station may be overridden by providing particular override instructions to the OCS 44. The MSC 42 may then, assuming that the originating mobile station 13*a* is associated with an account that is permitted to send messages (e.g., is current), transmit the message received from the originating mobile station 13*a* to the destination mobile station 13*b* based on the first response message. For example, the first signaling message may be delivered to mobile station 13*b* when it is determined by the OCS 44 that the account is associated with valid monthly prepaid wireless subscription plan that has sufficient balance. Otherwise, when the account is associated with valid monthly prepaid wireless subscription plan that does not have sufficient balance, the message may not be delivered via the MSC 42 to the destination mobile station 13*b*.

In some implementations, referring to FIG. 1B, when it is determined at the OCS 44 that the account is not associated with a valid monthly prepaid wireless subscription plan, a second response message is received from the OCS 44 at the MSC 42 indicating whether the account associated with the originating mobile station 13*a* has sufficient account balance to process the message from the originating mobile station 13*a*. In some implementations, the first response message can be stored at the MSC 42 until updated, where the first response message indicates to the MSC 42 to not send future requests to the OCS 44 to determine an account usage balance associated with the mobile station 13*a*. In this way, for example, the disclosed implementations avoid recurring validations from a voice and message network element (e.g., MSC 42) of a wireless network with the OCS 44 when the mobile station 13*a* is associated with a prepaid data plan that may be valid.

In some implementations, at the MSC 42, a second signaling message (that may be subsequent to the first signaling message) may be received from the originating mobile station 13*a* for transmission over a network to a destination mobile station 13*b*. The message may include a voice or a data message. Upon receipt of the second message from the originating mobile station 13*a*, the predetermined time associated with the stored first response message may be analyzed at the MSC 42. Upon the analyzing, the MSC 42 may proscribe or prevent another request from being sent to the OCS 44 to determine the account usage balance associated with the mobile station 13*a*. In some implementations, the analysis may include determining a current time at which the second message is received from the originating mobile station 13*a*, comparing the current time (e.g., 12:01 AM, August 30) to the predetermined time (e.g., 12:01 AM, August 31) where the predetermined time indicates when the valid monthly prepaid wireless subscription plan usage of the originating mobile station expires. In some implementations, when the current time is before the predetermined time, the second message received from the originating mobile station 13*a* can be transmitted to the destination mobile station 13*b*. In some implementations, when the present time is after the predetermined time, transmission of the second message received from the originating mobile station 13*a* can be proscribed.

In this way, for example, the disclosed implementations avoid recurring validations from a voice and message network element (e.g., MSC 42) of a wireless network with the OCS 44 when the mobile station 13*a* is associated with a prepaid data plan that may be valid or unexpired.

In some implementations, when the present time is after the predetermined time, a notification can be provided for display at the originating mobile station 13*a*. The notification can indicate that the transmission of the message to the destination mobile station 13*b* has been proscribed, and providing, in addition to the notification, a user interface for display at the mobile station. The user interface can allow a user of the mobile station 13*a* to subscribe or add usage balance to a voice or data plan.

In this way, for every voice and message originated or terminated from mobile station 13*a*, the MSC 42 need not validate with OCS 44 if there is sufficient account balance for the voice and messaging call. Particularly, such validation need not occur with OCS 44 when a user has, for example, purchased an unlimited data and voice plan for the mobile station 13*a*. As a result, mobile stations subscribed to unlimited plans or any other valid prepaid plan need not contribute to wastage of network resources as for each call or data request there can be significantly less interaction between the voice and messaging network elements (e.g., MSC 42) and prepaid charging system (OCS 44).

In some implementations, the first response message from the OCS 44 to the MSC 42 (described above) can be a diameter protocol message that includes one or more attribute value pairs (AVPs). The AVPs indicate to the MSC 42 not to send future requests to the OCS 44 to determine an account usage balance associated with the originating mobile station 13*a*. In some implementations, the one or more AVPs can be service specific AVPs included within a multiple services credit control AVP in a credit control answer (CCA) message. In some implementations, when the mobile station is associated with a valid monthly prepay wireless subscription plan, the OCS 44 includes the one or more AVPs in the diameter protocol to indicate to MSC 42 or a Telephony Application Server (TAS) to proscribe requests from to the OCS 44 to determine an account usage balance associated with the originating mobile station. The request can be a credit control request (CCR) in accordance with a diameter protocol and the first response can be a credit control answer (CCA) in accordance with the diameter protocol. The disclosed implementations can also accommodate shared or family data and voice plans offered by a wireless network provider. For example, if there are multiple devices on the same plan, all of which have the same time period, the first signaling message from any of the devices can trigger the update in the MSC. In some implementations, even if they have different start dates during a particular month, the first signaling message from any of the devices on the same plan can trigger a database lookup of the predetermined plan expiration times associated with other devices.

Figure 2:
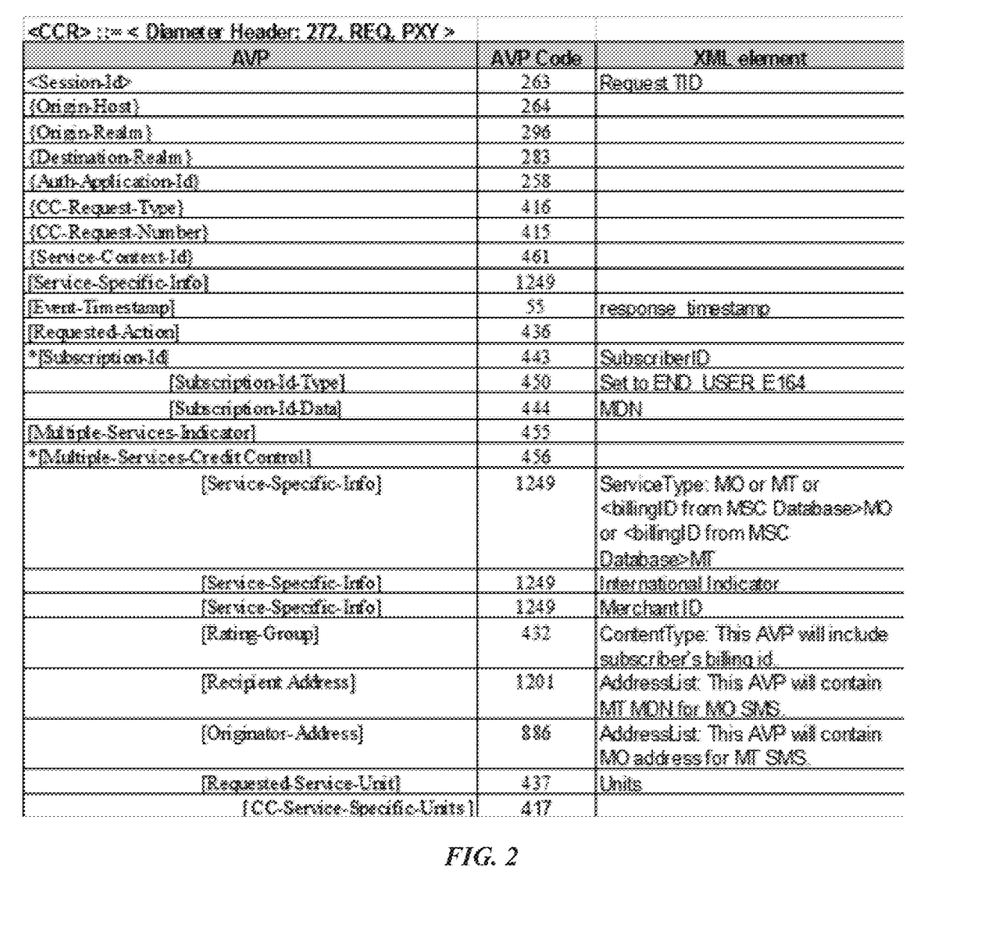
FIG. 2 illustrates an exemplary messaging credit control request (CCR) request in accordance with a diameter protocol.

FIG. 2 illustrates an example of a messaging CCR request in accordance with the diameter protocol. As an example, the CCR may be provided by the MSC 42 to the OCS 44 when the first signaling message is received at the MSC from the mobile station 13*a*. The CCR message may be generated by a diameter credit control application residing at the OCS 44 to provide a framework for real-time charging, generally meant for the communication between gateways/control-points and the back-end account/balance systems (typically an OCS).

The diameter credit control application can specify quota management, simple debit/credit, balance checks, price inquiries, etc. Examples of items charged include, but are not limited to, time, upload/download bytes, SMS (Text Messages). Examples of items charged, money, points units (e.g., if the balance is kept in the same units as what is being used). Diameter credit control can also specify how to handle the fairly complex issue of multiple unit types used/charged against a single user balance. For instance, a user may pay for both online time and download bytes but has only a single account balance. In order to support Credit Control via Diameter, there can be two Diameter messages, the CCR (Credit Control Request) and the CCA (Credit Control Answer). Command Code for CCR/CCA is 272, as defined in RFC 4006. For quota management the client (e.g., MSC 42) may send a CCR to the server requesting units and reporting consumption. The server (or OCS 44) grants units and charges the user. For a simple debit/credit, the MSC 42 may send a CCR asking the server to credit/debit the user's account. For price inquiries, the MSC 42 may ask the OCS 44 what the price for a unit is and the OCS 44 may respond with the price.

As discussed above, in some implementations, the first response message from the OCS 44 to the MSC 42 (described above) can be a diameter protocol message that includes one or more attribute value pairs (AVPs). The AVPs indicate to the MSC 42 not to send future requests to the OCS 44 to determine an account usage balance associated with the originating mobile station 13*a*. In some implementations, the one or more AVPs can be service specific AVPs included within a multiple services credit control AVP in a credit control answer (CCA) message.

Figure 3:
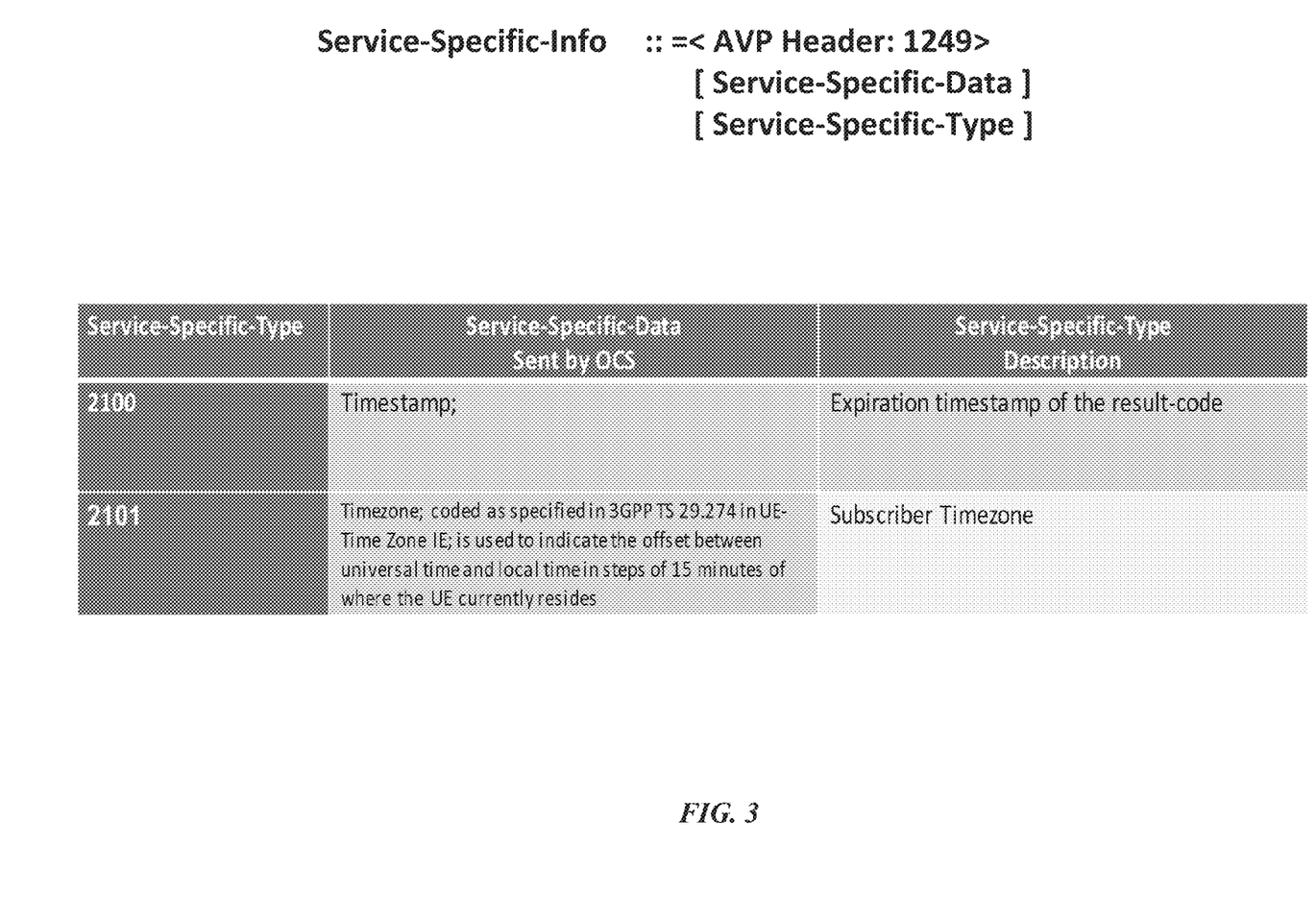
FIG. 3 illustrates exemplary service specific attribute value pairs (AVPs) in accordance with the disclosed implementations.

FIG. 3 illustrates exemplary service specific AVPs in accordance with the disclosed implementations. The new Service-Specific-Info AVP holds service specific data provided by OCS 44. The new service specification info AVP may have the following Augmented Backus-Naur Form (ABNF) grammar. In computer science, ABNF is a metalanguage based on Backus-Naur Form (BNF), but consisting of its own syntax and derivation rules. The motive principle for ABNF is to describe a formal system of a language to be used as a bidirectional communications protocol. It is defined by Internet Standard 68 and it often serves as the definition language for IETF communication protocols. In some implementations, Service-Specific-Type in an AVP may be populated based on the following rules: Octet 1: This may be set to 10101011 (or 0xAB) and Octet 2-4 may contain the value of the service specific type. An octet is a unit of digital information in computing and telecommunications that includes eight bits.

Figure 4:
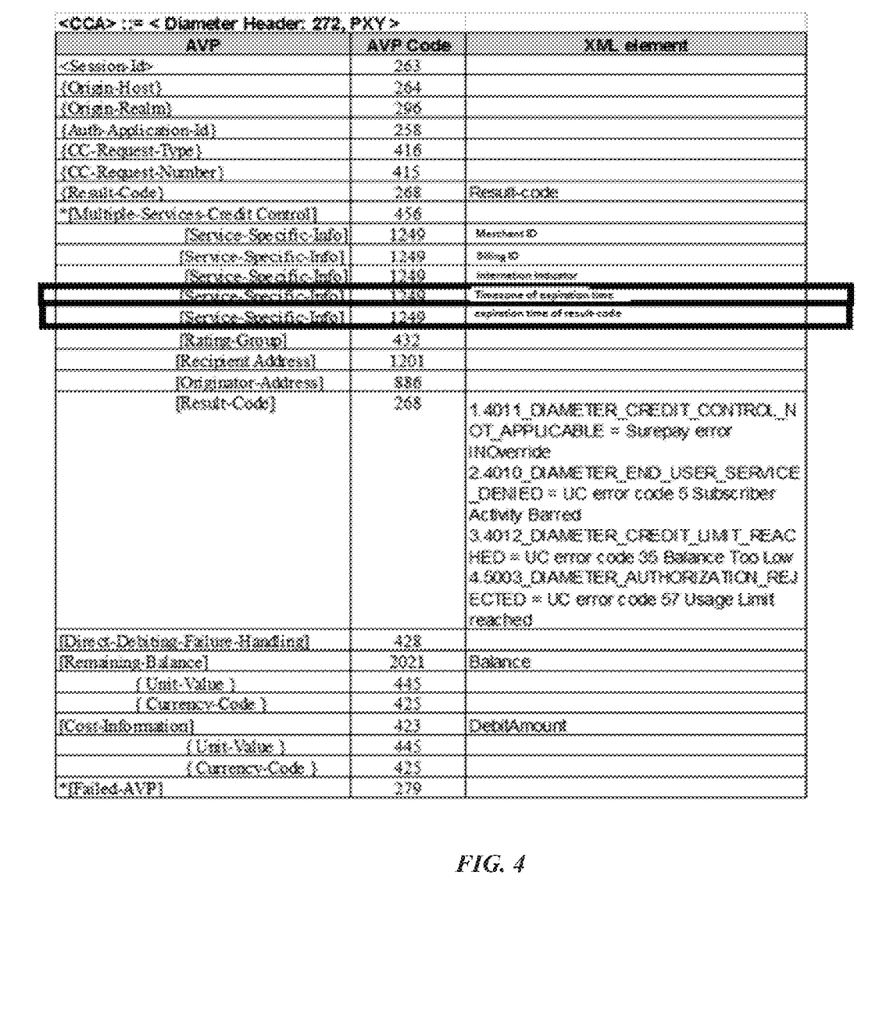
FIG. 4 illustrates an exemplary credit control answer (CCA) message that may be provided in accordance with the disclosed implementations.

FIG. 4 illustrates an exemplary CCA message that may be provided from the OCS 44 to the MSC 42. As shown in FIG. 4 the highlighted service specific information AVPs can indicate a time-zone of the expiration time and also an expiration time. The service AVPs according to the disclosed implementations may have their respective AVP code which may be any pre-defined number or alphanumeric string. In some implementations, upon receipt of a second message from the originating mobile station 13*a*, the predetermined time (e.g., the expiration time) associated with the stored first response message may be analyzed at the MSC 42. Particularly, the service AVP values highlighted in FIG. 4 may be analyzed. Based on the analysis, the MSC 42 may proscribe to or prevent another request from the OCS 44 to determine the account usage balance associated with the mobile station 13*a*. In some implementations, the analysis may further comprise, determining a current time at which the second message is received from the originating mobile station 13*a* and comparing the current time to the predetermined time. The predetermined time can indicate when the valid monthly prepaid wireless subscription plan usage of the originating mobile station expires. This may also be indicated by a service AVP in the CCA message of FIG. 4.

Figure 5:
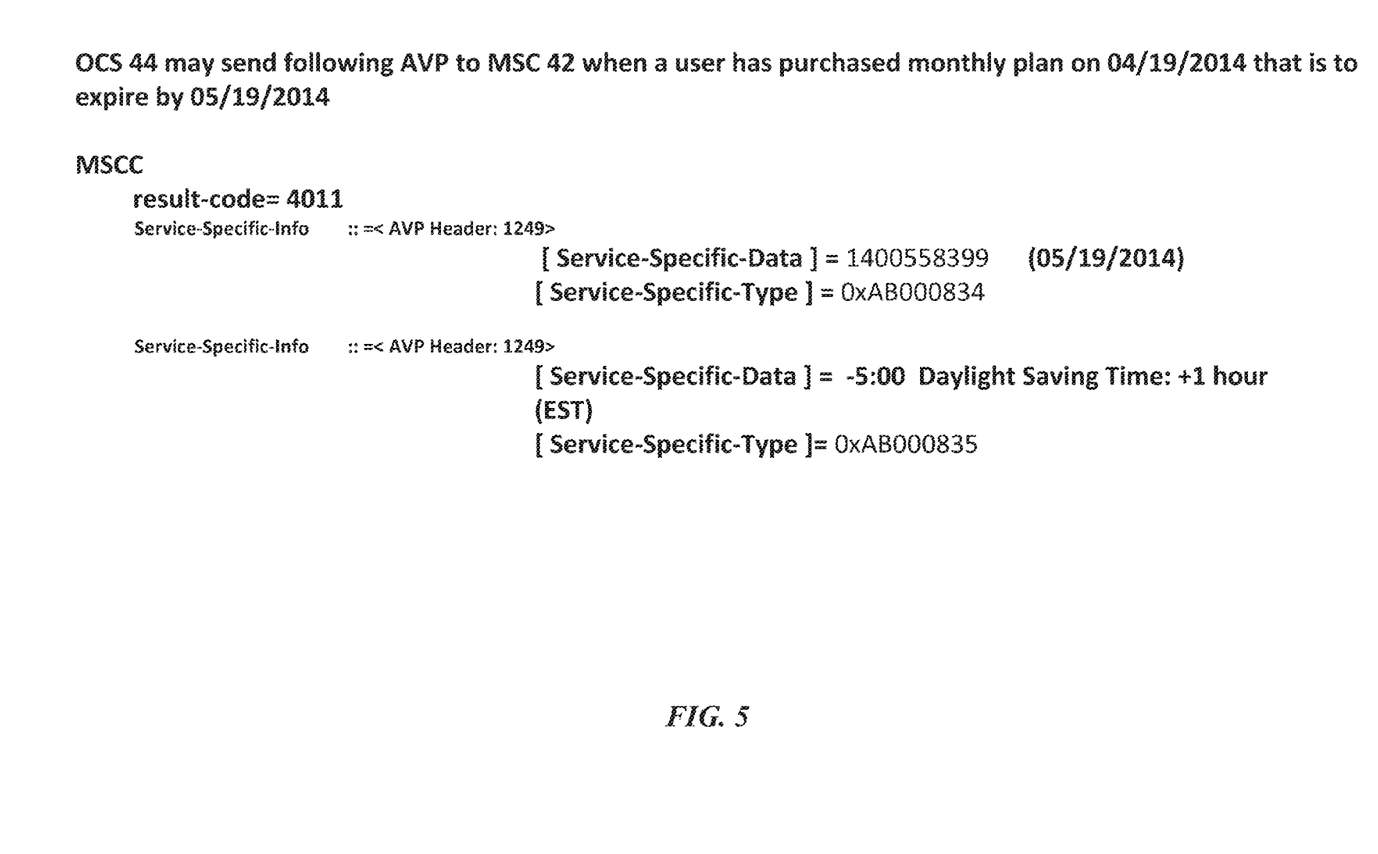
FIG. 5 illustrates exemplary values that may be included in a CCA response message.

FIG. 5 illustrates exemplary values that may be included in a CCA response message from the OCS 44. For example, when a user has purchased monthly plan on Apr. 19, 2014 that is to expire by May 19, 2014. OCS 44 may send the AVP in FIG. 5 to MSC 42 or even a Telephony Application Server or TAS. For example, in an AVP message embedded in a CCA response, a service specific data value can be "1400558399" (or May 19, 2014). This value may indicate a service specific type of expiration time of result code and this specific type may be indicated by a hexadecimal value 0xAB000834. These values, when received at the MCS 42, may be automatically decoded by the MCS 42 to determine that the expiration time is May 19, 2014. In another example, in an AVP message embedded in a CCA response, a service specific data value can be "5:00 Daylight Saving Time: +1 hour (EST)." This value may indicate a service specific type of time zone and this specific type may be indicated by a hexadecimal value 0xAB000835. These values, when received at the MCS 42, may be automatically decoded by the MCS 42 to determine that the time zone of the expiration time is 5:00 Daylight Saving Time: +1 hour (EST). In some implementations, when the current time (e.g., Apr. 19, 2014) is before the predetermined time (e.g., May 19, 2014), the second message received from the originating mobile station 13*a* can be transmitted to the destination mobile station 13*b*. In some implementations, when the present time is after the predetermined time, transmission of the second message received from the originating mobile station 13*a* can be proscribed.

The examples illustrated and described with reference to FIG. 5 are purely illustrative and are not intended to limit the disclosed implementations.

The enhanced OCS service under consideration here may be delivered to touch screen type mobile stations as well as to non-touch type mobile stations. Hence, our simple example shows the mobile station (MS) 13*a* as a non-touch type mobile station and shows the mobile station (MS) 13 as a touch screen type mobile station. Implementation of the on-line enhanced OCS service will involve at least some execution of programming in the mobile stations as well as implementation of user input/output functions and data communications through the network 15, from the mobile stations.

Those skilled in the art presumably are familiar with the structure, programming and operations of the various type of mobile stations. However, for completeness, it may be useful to consider the functional elements/aspects of two exemplary mobile stations 13*a* and 13*b*, at AS a high-level.

Figure 6:
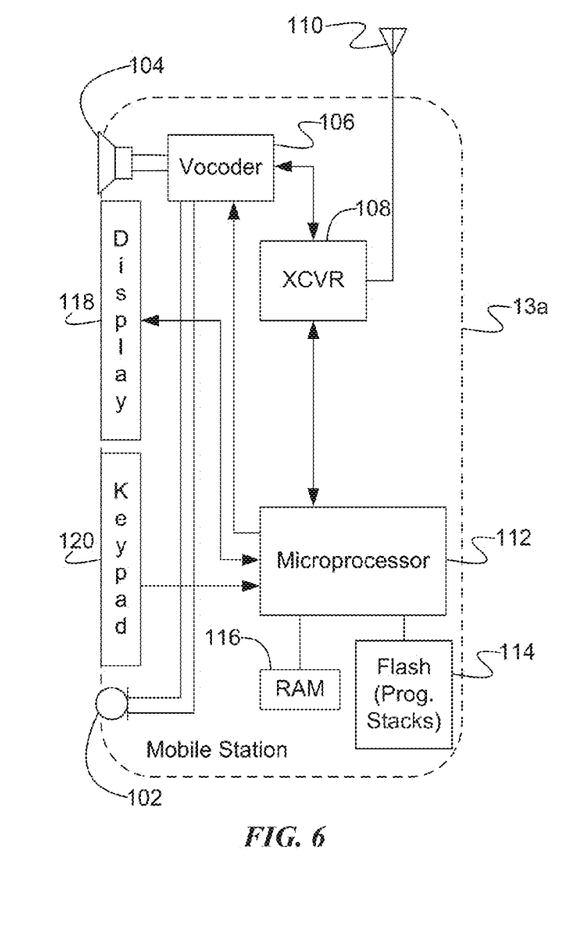
FIG. 6 is a high-level functional block diagram of an exemplary non-touch type mobile station that may utilize the enhanced OCS service through a network/system like that shown in FIG. 1.

For purposes of such a discussion, FIG. 6 provides a block diagram illustration of an exemplary non-touch type mobile station 13*a*. Although the mobile station 13*a* may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including notifications and user interfaces related to the enhanced OCS service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the enhanced OCS service.

A microprocessor 112 serves as a programmable controller for the mobile station 13a, in that it controls all operations of the mobile station 13a in accord with programming that it executes, for all normal operations, and for operations involved in the enhanced OCS service procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

Figure 7:
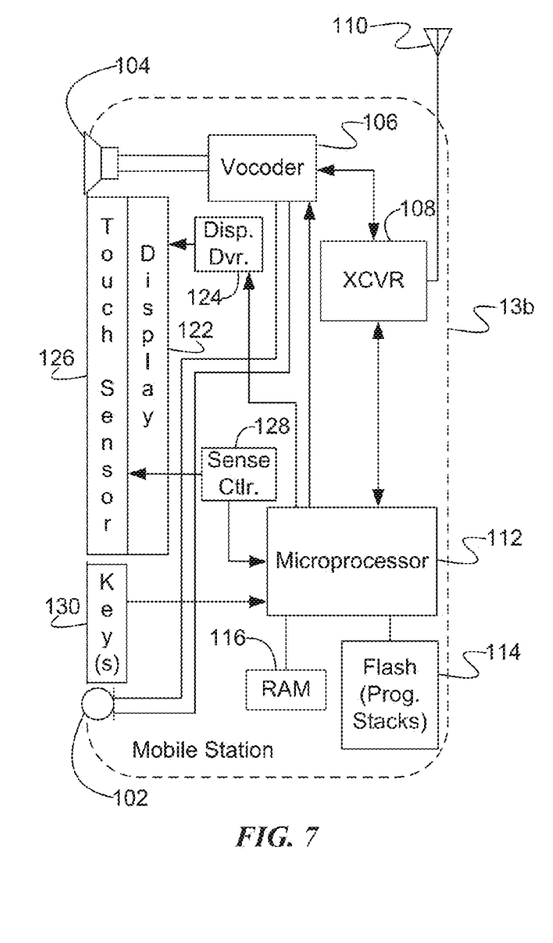
FIG. 7 is a high-level functional block diagram of an exemplary touch screen type mobile station that may utilize the enhanced OCS service through a network/system like that shown in FIG. 1.

As outlined above, the mobile station 13a includes a processor, and programming stored in the flash memory 114 configures the processor so that the mobile station is capable of performing various desired functions, including in this case the functions involved in techniques for the enhanced OCS service For purposes of such a discussion, FIG. 7 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 7. For example, the touch screen type mobile station 13b includes a microphone 102, speaker 104 and vocoder 106, for audio input and output functions, much like in the earlier example. The mobile station 13b also includes a at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the enhanced OCS procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing the enhanced OCS procedure.

In the example of FIG. 6, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some OCS related functions.

The structure and operation of the mobile stations 13a and 13b, as outlined above, were described to by way of example, only.

As shown by the above discussion, functions relating to the an enhanced OCS service, via a graphical user interface of a mobile station may be implemented on computers connected for data communication via the components of a packet data network, operating as an OCS server as shown in FIG. 1. Although special purpose devices may be used, such devices also may be implemented using one or more hardware platforms intended to represent a general class of data processing device commonly used to run "server" programming so as to implement the enhanced OCS functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the enhanced OCS service. The software code is executable by the general-purpose computer that functions as the OCS server and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the enhanced OCS service in essentially the manner performed in the implementations discussed and illustrated herein.

Figures 8, 9:
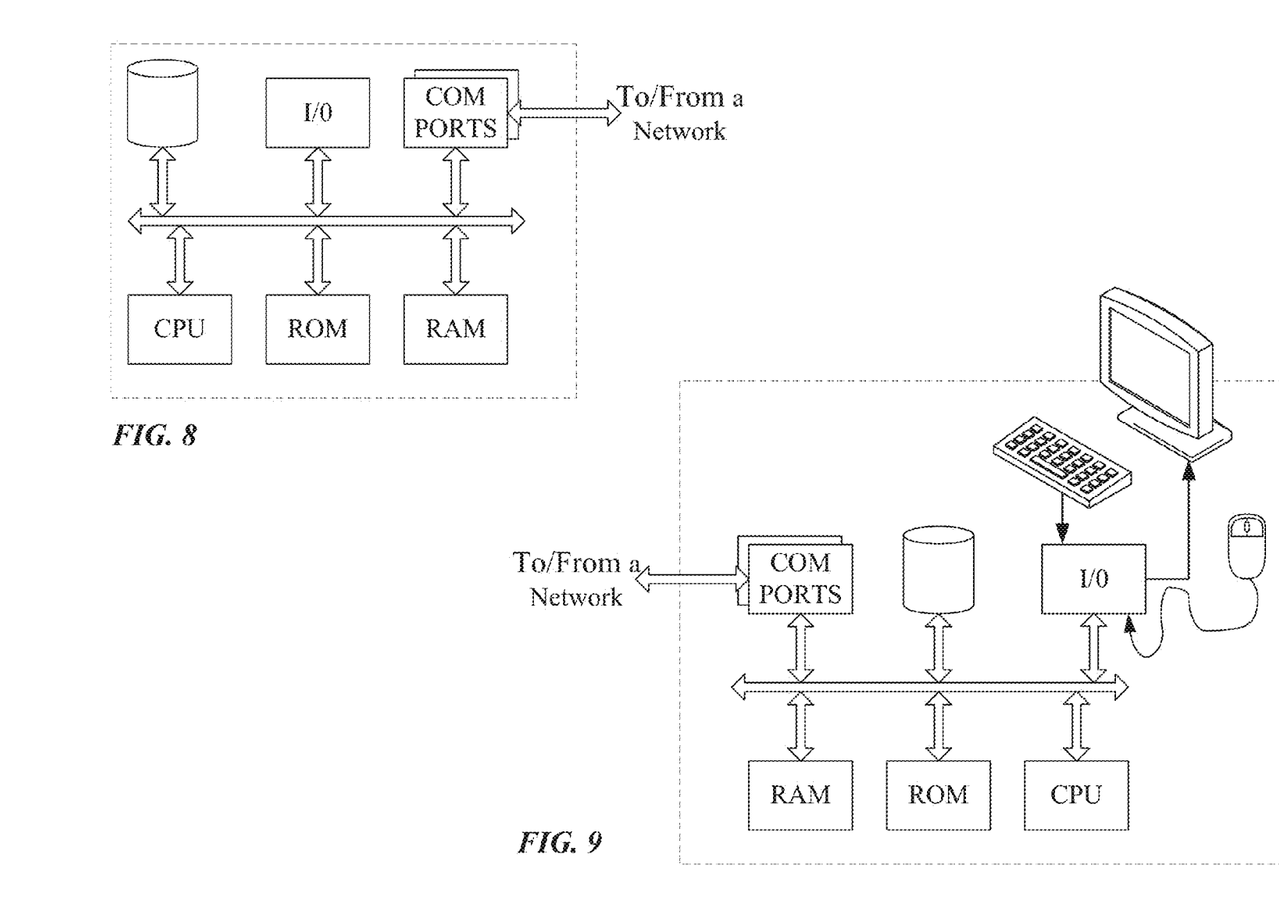
FIG. 8 is a simplified functional block diagram of a computer that may be configured as a host or server, for example, to function as the OCS in the system of FIG. 1.
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of the enhanced OCS service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider into the computer platform of the enhanced OCS service that will be the OCS server. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the enhanced OCS service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
   receiving, at a server, a first signaling message from an originating mobile station for transmission over a network to a destination mobile station, wherein the first signaling message is a request for a voice, data or a text messaging service;
   upon receiving the first signaling message from the originating mobile station, providing a request from the server to an online charging system (OCS) to determine an account usage balance of an account associated with the originating mobile station;
   when it is determined at the OCS that the account is associated with a valid monthly prepaid wireless subscription plan, receiving a first response message at the server, wherein the first response message indicates to the server to not send, until a predetermined plan expiration time, further requests to the OCS to determine an account usage balance associated with the originating mobile station, wherein the predetermined plan expiration time indicates a predetermined calendar date when the monthly prepaid wireless subscription plan expires; and transmitting the first signaling message received from the originating mobile station to the destination mobile station based on the first response message.

2. The method of claim 1, further comprising:

when it is determined at the OCS that the account is not associated with the valid monthly prepaid wireless subscription plan, receiving from the OCS a response message at the server indicating whether the account associated with the originating mobile station has sufficient account balance to process the first signaling message from the originating mobile station.

3. The method of claim 1, further comprising:

storing the first response message at the server, wherein the first response message indicates to the server to not send future requests to the OCS to determine an account usage balance associated with the originating mobile station;

receiving, at the server, a second signaling message from the originating mobile station for transmission over a network to the destination mobile station, wherein the second signaling message includes a voice or a data message;

upon receipt of the second signaling message from the originating mobile station, analyzing the predetermined plan expiration time associated with the stored first response message; and upon the analyzing, proscribing another request from the server to the OCS to determine the account usage balance associated with the originating mobile station.

4. The method of claim 3, the analyzing further comprising:

determining a current time at which the second signaling message is received from the originating mobile station;

comparing the current time to the predetermined plan expiration time;

when the current time is before the predetermined plan expiration time, transmitting the second signaling message received from the originating mobile station to the destination mobile station; and when the current time is after the predetermined plan expiration time, requesting additional instructions on how to process the second signaling message and proscribing transmission of the second signaling message received from the originating mobile station to the destination mobile station.

5. The method of claim 4, further comprising:

when the current time is after than the predetermined plan expiration time, providing a notification for display at the originating mobile station, the notification indicating that the transmission of the second signaling message to the destination mobile station has been proscribed; and providing, in addition to the notification, a user interface for display at the originating mobile station, the user interface allowing a user of the originating mobile station to subscribe or add usage balance to a voice or data plan.

6. The method of claim 1, wherein the first response message is a diameter protocol message including one or more attribute value pairs (AVPs), wherein the attribute value pairs indicate to the server not to send future requests to the OCS to determine an account usage balance associated with the originating mobile station.

7. The method of claim 6, wherein the one or more AVPs are service specific AVPs included within a multiple services credit control AVP in a credit control answer (CCA) message.

8. The method of claim 6, wherein when the originating mobile station is associated with a valid monthly prepay wireless subscription plan, the OCS includes the one or more AVPs in the diameter protocol to indicate to the server to proscribe requests from the OCS to determine an account usage balance associated with the originating mobile station.

9. The method of claim 1, wherein the request to determine an account usage balance is a credit control request (CCR) in accordance with a diameter protocol and the first response message includes a credit control answer (CCA) in accordance with the diameter protocol.

10. The method of claim 1, wherein the server is a mobile switching center (MSC), Short Message Service Center (SMSC) or Telephony Application Server (TAS).

11. A server comprising:

a communication interface configured to enable communication via a mobile network;

a processor coupled with the communication interface;

a storage device accessible to the processor; and an executable program in the storage device, wherein execution of the program by the processor configures the server to perform functions, including functions to:

receive, at the server, a first signaling message from an originating mobile station for transmission over a network to a destination mobile station, wherein the first signaling message is a request for a voice, data or text messaging service;

upon receipt of the first signaling message from the originating mobile station, provide a request from the server to an online charging system (OCS) to determine an account usage balance of an account associated with the originating mobile station;

when it is determined at the OCS that that the account is associated with a valid monthly prepaid wireless subscription plan, receive a first response message at the server, wherein the first response message indicates to the server not to send, until a predetermined plan expiration time, further requests to the OCS to determine an account usage balance associated with the originating mobile station, wherein the predetermined plan expiration time indicates a predetermined calendar date when the monthly prepaid wireless subscription plan expires; and transmit the first signaling message received from the originating mobile station to the destination mobile station based on the first response message.

12. The server of claim 11, wherein execution of the program by the processor configures the server to perform functions, including functions to:

when it is determined at the OCS that the account is not associated with the valid monthly prepaid wireless subscription plan, receive from the OCS a second response message at the server indicating whether the account associated with the originating mobile station has sufficient account balance to process the first signaling message from the originating mobile station.

13. The server of claim 11, wherein execution of the program by the processor configures the server to perform functions, including functions to:

store the first response message at the server, wherein the first response message indicates to the server to not send future requests to the OCS to determine an account usage balance associated with the originating mobile station;

receive, at the server, a second signaling message from the originating mobile station for transmission over a network to the destination mobile station, wherein the second signaling message includes a voice or a data message;

upon receipt of the second signaling message from the originating mobile station, analyze the predetermined plan expiration time associated with the stored first response message;

upon the analyzing, proscribe another request from the server to the OCS to determine the account usage balance associated with the originating mobile station.

14. The server of claim 13, the analyzing further including functions to:

determine a current time at which the second signaling message is received from the originating mobile station;

compare the current time to the predetermined plan expiration time;

when the current time is before the predetermined plan expiration time, transmit the second signaling message received from the originating mobile station to the destination mobile station; and when the current time is after the predetermined plan expiration time, request additional instructions on how to process the second signaling message and proscribe transmission of the second signaling message received from the originating mobile station to the destination mobile station.

15. The server of claim 14, wherein execution of the program by the processor configures the server to perform functions, including functions to:

when the current time is after the predetermined plan expiration time, provide a notification for display at the originating mobile station, the notification indicating that the transmission of the second signaling message to the destination mobile station has been proscribed; and provide, in addition to the notification, a user interface for display at the originating mobile station, the user interface allowing a user of the originating mobile station to subscribe or add usage balance to a voice or data plan.

16. The server of claim 11, wherein the first response message is a diameter protocol message including one or more attribute value pairs (AVPs), wherein the attribute value pairs indicate to the server not to send future requests to the OCS to determine an account usage balance associated with the originating mobile station.

17. The server of claim 16, wherein the one or more AVPs are service specific AVPs included within a multiple services credit control AVP in a credit control answer (CCA) message.

18. The server of claim 16, wherein when the originating mobile station is associated with a valid monthly prepay wireless subscription plan, the OCS includes the one or more AVPs in the diameter protocol to indicate to the server to proscribe requests from the OCS to determine an account usage balance associated with the originating mobile station.

19. The server of claim 11, wherein the request to determine an account usage balance is a credit control request (CCR) in accordance with a diameter protocol and the first response message includes a credit control answer (CCA) in accordance with the diameter protocol.

20. A non-transitory computer-readable medium comprising instructions which, when executed by one or more computers, cause the one or more computers to:

receive, at a server, a first signaling message from an originating mobile station for transmission over a network to a destination mobile station, wherein the first signaling message is a request for a voice, data or text messaging service;

upon receipt of the first signaling message from the originating mobile station, provide a request from the server to an online charging system (OCS) to determine an account usage balance of an account associated with the originating mobile station;

when it is determined at the OCS that the account is associated with a valid monthly prepaid wireless subscription plan, receive a first response message at the server, wherein the first response message indicates to the server to not send, until a predetermined plan expiration time, further requests to the OCS to determine an account usage balance associated with the originating mobile station, wherein the predetermined plan expiration time indicates a predetermined calendar date when the monthly prepaid wireless subscription plan expires; and transmit the first signaling message received from the originating mobile station to the destination mobile station based on the first response message.

21. The computer-readable medium of claim 20 further comprising instructions which, when executed by the one or more computers, cause the one or more computers to:

when it is determined at the OCS that the account is not associated with the valid monthly prepaid wireless subscription plan, receiving from the OCS a second response message at the server indicating whether the account associated with the originating mobile station has sufficient account balance to process the first signaling message from the originating mobile station.

22. The server of claim 11, wherein the server is a mobile switching center (MSC), Short Message Service Center (SMSC) or Telephony Application Server (TAS).

* * * * *